(12) United States Patent
Matsushima (10) Patent No.: US 12,358,173 B2
(45) Date of Patent: Jul. 15, 2025

(54) CUTTING DEVICE, AND MANUFACTURING DEVICE FOR LAMINATED ELECTRODE ASSEMBLY

(71) Applicant: Panasonic Holdings Corporation, Osaka (JP)

(72) Inventor: Hiroyuki Matsushima, Osaka (JP)

(73) Assignee: Panasonic Holdings Corporation, Osaka (JP)

(*) Notice: Subject to any disclaimer, the term of this patent is extended or adjusted under 35 U.S.C. 154(b) by 465 days.

(21) Appl. No.: 17/788,619

(22) PCT Filed: Nov. 19, 2020

(86) PCT No.: PCT/JP2020/043149
§ 371 (c)(1),
(2) Date: Jun. 23, 2022

(87) PCT Pub. No.: WO2021/131433
PCT Pub. Date: Jul. 1, 2021

(65) Prior Publication Data
US 2022/0355499 A1    Nov. 10, 2022

(30) Foreign Application Priority Data

Dec. 26, 2019  (JP) .................. 2019-236207

(51) Int. Cl.
*H01F 7/06*  (2006.01)
*B26D 1/62*  (2006.01)
(Continued)

(52) U.S. Cl.
CPC ............... *B26D 1/62* (2013.01); *H01M 4/04* (2013.01); *H01M 10/0404* (2013.01); *H01M 50/406* (2021.01); *H01M 50/46* (2021.01)

(58) Field of Classification Search
CPC .......... H01M 10/0413; H01M 50/406; H01M 50/46; H01M 4/04; H01M 4/139;
(Continued)

(56) References Cited

U.S. PATENT DOCUMENTS 9,425,478 B2   8/2016  Yuhara et al.
10,981,249 B2 * 4/2021 Watanabe ............ B23K 26/402
(Continued)

FOREIGN PATENT DOCUMENTS

CN     103460485 A    12/2013
CN     105492187 A     4/2016
(Continued)

OTHER PUBLICATIONS

International Search Report issued in corresponding International Application No. PCT/JP2020/043149, dated Jan. 19, 2021, with English translation.
(Continued)

*Primary Examiner* — Paul D Kim
(74) *Attorney, Agent, or Firm* — Rimon P.C.

(57) ABSTRACT

A cutting device includes a drum section that rotates to convey a continuous body, and a cutting section that cuts the continuous body into multiple individual works. The drum section includes multiple holding heads that move while holding the respective works. The cutting section includes a cutter unit that moves together with multiple holding heads and that is smaller in number than the holding heads, and a cutter drive unit that moves the cutter unit independently of multiple holding heads. The cutter unit moves alongside of the continuous body from a certain cutting start position to cut the continuous body. The cutter drive unit returns the cutter unit that has cut the continuous body, to the cutting start position.

3 Claims, 4 Drawing Sheets

(51) Int. Cl.
*H01M 4/04* (2006.01)
*H01M 10/04* (2006.01)
*H01M 50/406* (2021.01)
*H01M 50/46* (2021.01)

(58) Field of Classification Search
CPC ............ H01M 10/04; H01M 10/0585; H01M 10/0404; B26D 7/015; B26D 7/018; B26D 1/165; B26D 1/245; B26D 1/526; B26D 1/585; B26D 1/605; B26D 1/62; B32B 38/0004; B32B 38/185; B32B 37/02; B32B 37/0053; B32B 37/046; B32B 37/06; B32B 37/10; B32B 37/1207; B32B 37/22; Y02P 70/50; Y02E 60/10
See application file for complete search history.

(56) References Cited

U.S. PATENT DOCUMENTS

| | | | |
|---|---|---|---|
| 11,235,426 B2* | 2/2022 | Watanabe | B23K 26/0846 |
| 11,996,541 B2* | 5/2024 | Masada | H01M 4/04 |
| 2014/0020239 A1 | 1/2014 | Yuhara et al. | |

FOREIGN PATENT DOCUMENTS

| | | |
|---|---|---|
| JP | 2011-086508 A | 4/2011 |
| JP | 2012-106370 A | 6/2012 |

OTHER PUBLICATIONS

Extended European Search Report issued in corresponding European Patent Application No. 20907977.1, dated Jun. 9, 2023.

* cited by examiner

CUTTING DEVICE, AND MANUFACTURING DEVICE FOR LAMINATED ELECTRODE ASSEMBLY

CROSS-REFERENCE TO RELATED APPLICATIONS

This application is the U.S. National Phase under 35 U.S.C. § 371 of International Patent Application No. PCT/JP2020/043149, filed on Nov. 19, 2019, which in turn claims the benefit of Japanese Patent Application No. 2019-236207, filed on Dec. 26, 2019, the entire content of each of which is incorporated herein by reference.

BACKGROUND

Field of the Invention

The present disclosure relates to a cutting device, and a manufacturing device for a laminated electrode assembly.

Description of the Related Art

As in-vehicle batteries, for example, laminate-type batteries have been developed. Such a battery has a structure in which a container contains a laminated electrode assembly, in which multiple positive electrodes and multiple negative electrodes are alternatively laminated with a separator in between, and an electrolyte.

With regard to such a battery, Patent Literature 1 discloses a device for manufacturing a laminated electrode assembly in which a positive electrode, a negative electrode, and a separator are laminated, using, as materials, a continuous positive electrode material in which positive electrodes are continuously formed with a break line provided in between, a continuous negative electrode material in which negative electrodes are continuously formed with a break line provided in between, and a continuous separator material in which separators are continuously formed with a break line provided in between. This manufacturing device has a structure in which a continuous battery material, formed by superimposing the materials over each other, is wound around a winding drum a required number of times, and a side circumferential surface of the winding drum is partially projected in a radial direction to cut the continuous battery material at each break line.

Patent Literature 1: Japanese Unexamined Patent Application Publication No. 2011-86508

With the abovementioned conventional manufacturing device, individual laminated electrode assemblies are manufactured by breaking the continuous battery material along the break lines. Accordingly, there has been a risk of burrs occurring at the cut section of each of the individually divided electrodes. Such a burr generated at an end of an electrode may cause a short circuit, which may lead to deterioration in the quality of the laminated electrode assembly and thus the battery.

SUMMARY OF THE INVENTION

The present disclosure has been made in view of such a situation, and a purpose thereof is to provide a technology for improving the quality of laminated electrode assemblies.

One aspect of the present disclosure relates to a cutting device. The cutting device includes a drum section that rotates to convey a continuous body of works, and a cutting section that cuts the continuous body into multiple individual works. The drum section includes multiple holding heads that are arranged in its circumferential direction and move while holding the respective works. The cutting section includes a cutter unit that moves together with multiple holding heads by means of the rotation of the drum section and that is smaller in number than the holding heads, and a cutter drive unit that moves the cutter unit independently of multiple holding heads. The cutter unit moves alongside of the continuous body from a certain cutting start position to cut the continuous body. The cutter drive unit returns the cutter unit that has cut the continuous body, to the cutting start position.

Another aspect of the present disclosure relates to a manufacturing device for a laminated electrode assembly. The manufacturing device includes: a first electrode cutting drum that cuts a continuous body of multiple first electrode plates into multiple first electrode plates and conveys the first electrode plates; a second electrode cutting drum that cuts a continuous body of multiple second electrode plates into multiple second electrode plates and conveys the second electrode plates; a bonding drum that laminates and bonds a first separator continuous body in which multiple first separators are continuously arranged, multiple first electrode plates supplied from the first electrode cutting drum, a second separator continuous body in which multiple second separators are continuously arranged, and multiple second electrode plates supplied from the second electrode cutting drum in this order, so as to form a continuous laminated body in which unit laminated bodies, which each are constituted by a first separator, a first electrode plate, a second separator, and a second electrode plate, are continuously arranged; a separator cutting drum that cuts the first separator continuous body and the second separator continuous body in the continuous laminated body to obtain multiple unit laminated bodies; and a laminating drum that laminates multiple unit laminated bodies on a lamination stage to form a laminated electrode assembly. At least one of the first electrode cutting drum, the second electrode cutting drum, or the separator cutting drum is constituted by the cutting device according to the one aspect.

Optional combinations of the aforementioned constituting elements, and implementation of the present disclosure in the form of methods, apparatuses, or systems may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

In the following, the present disclosure will be described based on a preferred embodiment with reference to the drawings. The embodiment is intended to be illustrative only and not to limit the present disclosure, so that it should be understood that not all of the features or combinations thereof described in the embodiment are necessarily essential to the present disclosure. Like reference characters denote like or corresponding constituting elements, members, and processes in each drawing, and repetitive description will be omitted as appropriate.

Also, the scale or shape of each component shown in each drawing is defined for the sake of convenience to facilitate the explanation and is not to be regarded as limitative unless otherwise specified. Further, when the terms "first", "second", and the like are used in the present specification or claims, such terms do not imply any order or degree of importance and are used to distinguish one configuration from another, unless otherwise specified. Further, in each drawing, part of members less important in describing the embodiment may be omitted.

Figure 1:
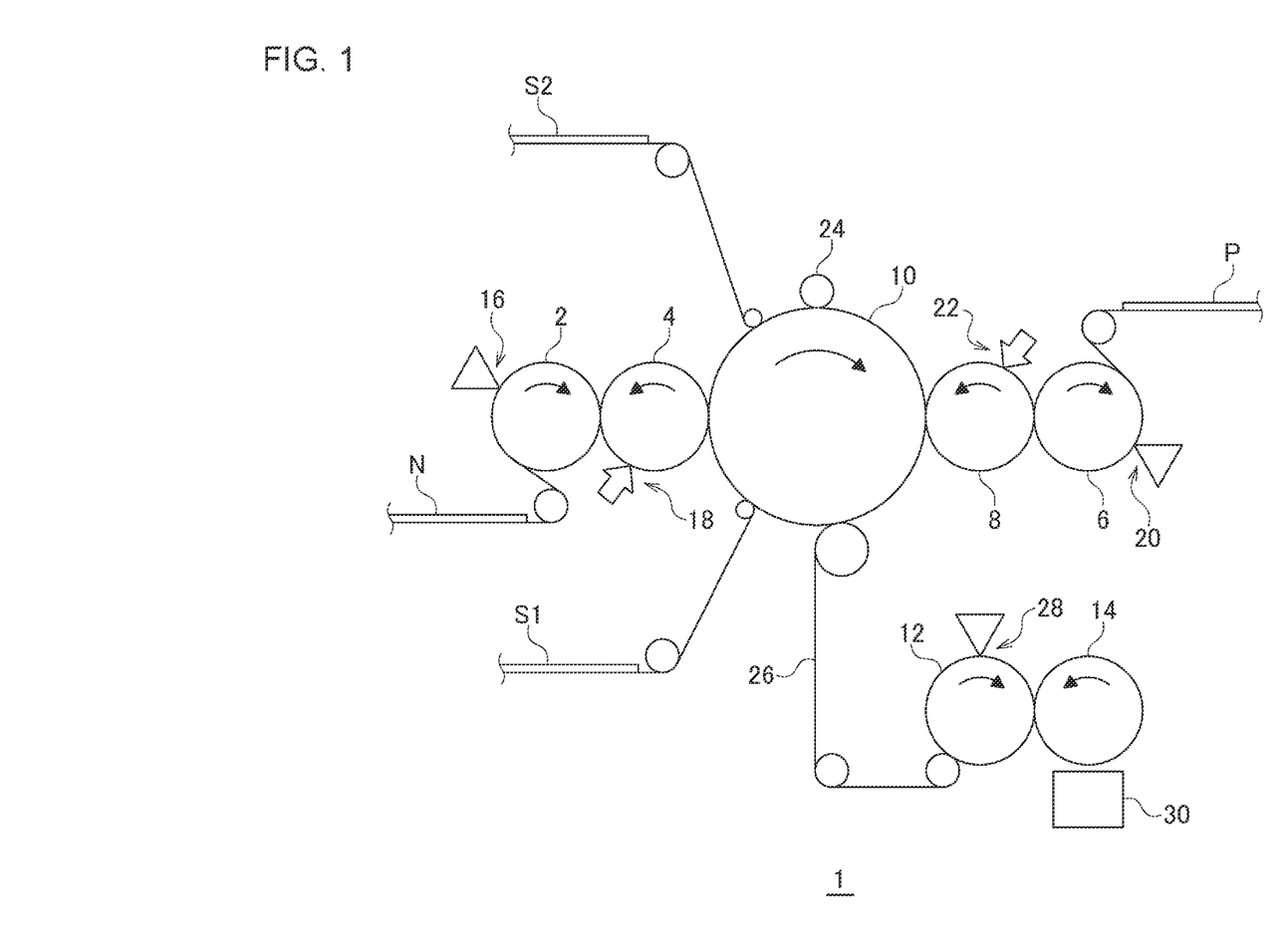
FIG. 1 is a schematic diagram of a manufacturing device for a laminated electrode assembly according to an embodiment.

FIG. 1 is a schematic diagram of a manufacturing device for a laminated electrode assembly according to an embodiment. A manufacturing device 1 for a laminated electrode assembly is a continuous drum-type manufacturing device in which multiple drums are combined. Performing each process of cutting, heating, bonding, laminating, and the like of electrode bodies and separators on the drums enables high-speed and continuous manufacturing of laminated electrode assemblies. The laminated electrode assemblies may be used, for example, for lithium-ion secondary batteries.

The manufacturing device 1 includes a first electrode cutting drum 2, a first electrode heating drum 4, a second electrode cutting drum 6, a second electrode heating drum 8, a bonding drum 10, a separator cutting drum 12, and a laminating drum 14.

The first electrode cutting drum 2 cuts a continuous body of multiple first electrode plates into multiple individual first electrode plates and conveys the plates. The first electrode cutting drum 2 has a first radius and rotates at a first angular velocity around the central axis. In the present embodiment, the first electrode is a negative electrode. To the first electrode cutting drum 2, a strip-shaped first electrode continuous body N as the continuous body of multiple first electrode plates is supplied. The first electrode continuous body N includes a first electrode current collector and a first electrode active material layer. The first electrode active material layer is laminated on the first electrode current collector. In the present embodiment, the first electrode active material layer is laminated on the both sides of the first electrode current collector, but the first electrode active material layer may be laminated on only one side of the first electrode current collector.

Each of the first electrode current collector and the first electrode active material layer can be made of a publicly-known material and has a publicly-known structure. The first electrode current collector may be, for example, constituted by foil or a porous body made of copper, aluminum, or the like. The first electrode active material layer may be formed by applying, onto a surface of the first electrode current collector, first electrode mixture slurry containing a first electrode active material, a binder, a dispersant, and the like and by drying and rolling the applied film. The thickness of the first electrode current collector may be in the range from 3 µm to 50 µm inclusive, for example. Also, the thickness of the first electrode active material layer may be in the range from 10 µm to 100 µm inclusive, for example.

The first electrode cutting drum 2 includes multiple holding heads arranged in a circumferential direction of the drum, and a cutting blade that cuts the first electrode continuous body N into multiple individual first electrode plates. Each of the multiple holding heads includes a holding surface that adsorbs and holds the first electrode continuous body N. The holding surface of each holding head faces outward from the first electrode cutting drum 2. The first electrode continuous body N supplied to the first electrode cutting drum 2 is conveyed by the rotation of the first electrode cutting drum 2 while being adsorbed and held by the holding surfaces of the multiple holding heads.

Each of the multiple holding heads rotates around the central axis of the first electrode cutting drum 2 and can also move in a circumferential direction of the drum independently of other holding heads. Relative movement of each holding head is achieved by mounting thereon a motor that is different from the motor used to rotate the first electrode cutting drum 2. For example, if two holding heads adjacent to each other in a circumferential direction are assumed to be a first holding head and a second holding head, the first and second holding heads rotate around the central axis of the first electrode cutting drum 2 at a constant speed by means of the rotation of the first electrode cutting drum 2. Also, by the driving of the motor of each holding head, the relative speed of the two holding heads can be changed in a certain section on the circumference of the drum.

For example, at one timing, both the first and second holding heads rotate at a constant speed and have a relative speed of zero; at another timing, the first holding head increases its speed in a direction away from the subsequent second holding head, so that the holding heads have a finite relative speed. Such independent driving of the holding heads enables adjustment of the positions of cutting by the cutting blade in the first electrode continuous body N and also enables adjustment of the positions of the individually divided first electrode plates, for example. When each holding head should be rotated at a constant speed around the central axis of the first electrode cutting drum 2, to the movement of each holding head by means of the rotation of the first electrode cutting drum 2, constant speed movement of each holding head by means of the driving of the motor of each holding head may be added.

The first electrode cutting drum 2 adsorbs and holds the supplied first electrode continuous body N and rotates to convey the first electrode continuous body N. At a cutting position 16 schematically illustrated in FIG. 1, the first electrode cutting drum 2 cuts the first electrode continuous body N to produce the first electrode plates. The first electrode continuous body N is cut by the cutting blade at a position between adjacent holding heads, so that multiple individual first electrode plates are obtained. Each first electrode plate thus obtained is conveyed while being adsorbed and held by each holding head. The first electrode cutting drum 2 may include various cameras. Such cameras can monitor the positions of the multiple produced first electrode plates. As an example, the position of the first electrode continuous body N before the cutting is monitored at a conveying roller located on the upstream side of the first electrode cutting drum 2. The first electrode cutting drum 2 may also include a sensor besides cameras to monitor the position of a holding head or the like.

The first electrode heating drum 4 is disposed in close proximity to the first electrode cutting drum 2. The first electrode heating drum 4 has a second radius and rotates at a second angular velocity around the central axis. The second radius of the first electrode heating drum 4 may be the same as or different from the first radius of the first electrode cutting drum 2. Meanwhile, the second angular velocity of the first electrode heating drum 4 is different from the first angular velocity of the first electrode cutting drum 2. Also, the second angular velocity of the first electrode heating drum 4 is set so that the linear velocity thereof is substantially identical with the linear velocity of the bonding drum 10, which will be described later.

As an example, the second radius may be identical with the first radius, and the second angular velocity may be set higher than the first angular velocity. In this case, the linear velocity of the first electrode heating drum 4 is larger than the linear velocity of the first electrode cutting drum 2. Therefore, before the proximity position between the first electrode cutting drum 2 and the first electrode heating drum 4, the speed of a holding head of the first electrode cutting drum 2 is temporarily increased until it becomes substantially identical with the linear velocity of the first electrode heating drum 4. As a result, the relative speed of the holding head with respect to the first electrode heating drum 4 becomes substantially zero. At the timing when the relative speed becomes substantially zero, the holding head discharges, to the first electrode heating drum 4 side, the first electrode plate that the holding head has adsorbed and held. After the discharge of the first electrode plate, the speed of the holding head returns to the speed before the increase of speed.

The first electrode heating drum 4 rotates while adsorbing and holding the first electrode plates discharged from the first electrode cutting drum 2 and preheats the first electrode plates with a built-in heater. The preheating is performed to thermally bond a first electrode plate and a separator in the subsequent bonding process. Although the first electrode plates are heated at a heating position 18 in the present embodiment, the position is not limited thereto. For example, the first electrode plates may be heated in the entire circumferential area of the first electrode heating drum 4.

The second electrode cutting drum 6 cuts a continuous body of multiple second electrode plates into multiple individual second electrode plates and conveys the plates. The second electrode cutting drum 6 has a third radius and rotates at a third angular velocity around the central axis. In the present embodiment, the second electrode is a positive electrode. To the second electrode cutting drum 6, a strip-shaped second electrode continuous body P as the continuous body of multiple second electrode plates is supplied. The second electrode continuous body P includes a second electrode current collector and a second electrode active material layer. The second electrode active material layer is laminated on the second electrode current collector. In the present embodiment, the second electrode active material layer is laminated on the both sides of the second electrode current collector, but the second electrode active material layer may be laminated on only one side of the second electrode current collector.

Each of the second electrode current collector and the second electrode active material layer can be made of a publicly-known material and has a publicly-known structure. The second electrode current collector may be, for example, constituted by foil or a porous body made of stainless steel, aluminum, or the like. The second electrode active material layer may be formed by applying, onto a surface of the second electrode current collector, second electrode mixture slurry containing a second electrode active material, a binder, a dispersant, and the like and by drying and rolling the applied film. The thickness of the second electrode current collector may be in the range from 3 μm to 50 μm inclusive, for example. Also, the thickness of the second electrode active material layer may be in the range from 10 μm to 100 μm inclusive, for example.

The second electrode cutting drum 6 includes multiple holding heads arranged in a circumferential direction of the drum, and a cutting blade that cuts the second electrode continuous body P into multiple individual second electrode plates. Each of the multiple holding heads includes a holding surface that adsorbs and holds the second electrode continuous body P. The holding surface of each holding head faces outward from the second electrode cutting drum 6. The second electrode continuous body P supplied to the second electrode cutting drum 6 is conveyed by the rotation of the second electrode cutting drum 6 while being adsorbed and held by the holding surfaces of the multiple holding heads.

Each of the multiple holding heads rotates around the central axis of the second electrode cutting drum 6 and can also move in a circumferential direction of the drum independently of other holding heads. Relative movement of each holding head is achieved by mounting thereon a motor that is different from the motor used to rotate the second electrode cutting drum 6. For example, a first holding head and a second holding head adjacent to each other in a circumferential direction rotate around the central axis of the second electrode cutting drum 6 at a constant speed by means of the rotation of the second electrode cutting drum 6. Also, by the driving of the motor of each holding head, the relative speed of the two holding heads can be changed in a certain section on the circumference of the drum. The change in the relative speed of the first and second holding heads and the combination of the rotation of the second electrode cutting drum 6 and the driving of the motors provided in the holding heads are the same as those in the case of the first electrode cutting drum 2.

The second electrode cutting drum 6 adsorbs and holds the supplied second electrode continuous body P and rotates to convey the second electrode continuous body P. At a cutting position 20 schematically illustrated in FIG. 1, the second electrode cutting drum 6 cuts the second electrode continuous body P to produce the second electrode plates. The second electrode continuous body P is cut by the cutting blade at a position between adjacent holding heads, so that multiple individual second electrode plates are obtained. Each second electrode plate thus obtained is conveyed while being adsorbed and held by each holding head. The second electrode cutting drum 6 may include various cameras. Such cameras can monitor the positions of the multiple produced second electrode plates. As an example, the position of the second electrode continuous body P before the cutting is monitored at a conveying roller located on the upstream side of the second electrode cutting drum 6. The second electrode cutting drum 6 may also include a sensor besides cameras to monitor the position of a holding head or the like.

The second electrode heating drum 8 is disposed in close proximity to the second electrode cutting drum 6. The second electrode heating drum 8 has a fourth radius and rotates at a fourth angular velocity around the central axis. The fourth radius of the second electrode heating drum 8 may be the same as or different from the third radius of the second electrode cutting drum 6. Meanwhile, the fourth angular velocity of the second electrode heating drum 8 is different from the third angular velocity of the second electrode cutting drum 6. Also, the fourth angular velocity of the second electrode heating drum 8 is set so that the linear velocity thereof is substantially identical with the linear velocity of the bonding drum 10.

As an example, the fourth radius may be identical with the third radius, and the fourth angular velocity may be set higher than the third angular velocity. In this case, the linear velocity of the second electrode heating drum 8 is larger than the linear velocity of the second electrode cutting drum 6. Therefore, before the proximity position between the second electrode cutting drum 6 and the second electrode heating drum 8, the speed of a holding head of the second electrode cutting drum 6 is temporarily increased until it becomes substantially identical with the linear velocity of the second electrode heating drum 8. As a result, the relative speed of the holding head with respect to the second electrode heating drum 8 becomes substantially zero. At the timing when the relative speed becomes substantially zero, the holding head discharges, to the second electrode heating drum 8 side, the second electrode plate that the holding head has adsorbed and held. After the discharge of the second electrode plate, the speed of the holding head returns to the speed before the increase of speed.

The second electrode heating drum 8 rotates while adsorbing and holding the second electrode plates discharged from the second electrode cutting drum 6 and preheats the second electrode plates with a built-in heater. The preheating is performed to thermally bond a second electrode plate and a separator in the subsequent bonding process. Although the second electrode plates are heated at a heating position 22 in the present embodiment, the position is not limited thereto. For example, the second electrode plates may be heated in the entire circumferential area of the second electrode heating drum 8.

The bonding drum 10 forms a continuous laminated body in which unit laminated bodies, which each are constituted by a first separator, a first electrode plate, a second separator, and a second electrode plate, are continuously arranged. The bonding drum 10 is disposed in close proximity to the first electrode heating drum 4 and the second electrode heating drum 8. The bonding drum 10 has a fifth radius and rotates at a fifth angular velocity around the central axis. To the bonding drum 10, a strip-shaped first separator continuous body S1, in which multiple first separators are continuously arranged, and a strip-shaped second separator continuous body S2, in which multiple second separators are continuously arranged, are supplied. On a surface of each of the first separator continuous body S1 and the second separator continuous body S2, a thermal bonding layer is provided. The thermal bonding layer has a property of developing no adhesiveness at room temperature but developing adhesiveness when heated. The thermal bonding layer may be, for example, a thermoplastic layer containing a thermoplastic polymer, which develops adhesiveness based on plastic deformation of the thermoplastic polymer caused by heating.

Also, to the bonding drum 10, multiple first electrode plates are supplied from the first electrode cutting drum 2 via the first electrode heating drum 4, and multiple second electrode plates are supplied from the second electrode cutting drum 6 via the second electrode heating drum 8. A first electrode plate is rotationally conveyed while being preheated on the first electrode heating drum 4 and is discharged, to the bonding drum 10 side, at the proximity position between the first electrode heating drum 4 and the bonding drum 10. A second electrode plate is rotationally conveyed while being preheated on the second electrode heating drum 8 and is discharged, to the bonding drum 10 side, at the proximity position between the second electrode heating drum 8 and the bonding drum 10.

The first separator continuous body S1, each first electrode plate, the second separator continuous body S2, and each second electrode plate are supplied to the bonding drum 10 at positions provided in the enumerated order from the upstream side of the rotational direction of the bonding drum 10. Accordingly, the first separator continuous body S1 is supplied to the bonding drum 10 first at a certain position. The first separator continuous body S1 is adsorbed and held by the bonding drum 10 and rotationally conveyed. Subsequently, at a position on the downstream side of the supply position of the first separator continuous body S1, the first electrode plates are supplied from the first electrode heating drum 4 to the bonding drum 10 and placed on the first separator continuous body S1. The multiple first electrode plates are arranged on the first separator continuous body S1 at predetermined intervals in the conveying direction of the first separator continuous body S1.

Subsequently, at a position on the downstream side of the supply position of the first electrode plates, the second separator continuous body S2 is supplied to the bonding drum 10 and placed over the multiple first electrode plates. Thereafter, the first separator continuous body S1, multiple first electrode plates, and second separator continuous body S2 are pressurized by a thermocompression bonding roller 24, at a position on the downstream side of the supply position of the second separator continuous body S2. Accordingly, the first separator continuous body S1, each first electrode plate, and the second separator continuous body S2 are bonded together. Subsequently, at a position on the downstream side of the position of pressure bonding by the thermocompression bonding roller 24, the second electrode plates are supplied from the second electrode heating drum 8 to the bonding drum 10 and placed on the second separator continuous body S2. The multiple second electrode plates are arranged on the second separator continuous body S2 at predetermined intervals in the conveying direction of the second separator continuous body S2. Also, the multiple second electrode plates are bonded to the second separator continuous body S2 by the pressing force of the second electrode heating drum 8.

Through the process described above, the first separator continuous body S1, multiple first electrode plates, second separator continuous body S2, and multiple second electrode plates are laminated in this order and bonded to each other, forming a continuous laminated body 26. The continuous laminated body 26 has a structure in which the unit laminated bodies, which each are constituted by a first separator, a first electrode plate, a second separator, and a second electrode plate, are continuously connected by the first separator continuous body S1 and the second separator continuous body S2. The continuous laminated body 26 is conveyed from the bonding drum 10 to the separator cutting drum 12. By halting the supply of the second electrode plates from the second electrode cutting drum 6 side, three-layered unit laminated bodies without the second electrode plates may be produced after every fixed number of pieces. The electrode plates of which supply is halted may also be the first electrode plates.

The separator cutting drum 12 cuts the first separator continuous body S1 and the second separator continuous body S2 in the continuous laminated body 26 to obtain multiple individual unit laminated bodies. The separator cutting drum 12 has a sixth radius and rotates at a sixth angular velocity around the central axis. The separator cutting drum 12 includes multiple holding heads arranged in a circumferential direction of the drum, and a cutting blade that cuts the continuous laminated body 26 into multiple individual unit laminated bodies. Each of the multiple holding heads includes a holding surface that adsorbs and holds the continuous laminated body 26. The holding surface of each holding head faces outward from the separator cutting drum 12. The continuous laminated body 26 supplied to the separator cutting drum 12 is conveyed by the rotation of the separator cutting drum 12 while being adsorbed and held by the holding surfaces of the multiple holding heads.

Each of the multiple holding heads rotates around the central axis of the separator cutting drum 12 and may also be capable of moving in a circumferential direction of the drum independently of other holding heads. Relative movement of each holding head is achieved by mounting thereon a motor that is different from the motor used to rotate the separator cutting drum 12. For example, a first holding head and a second holding head adjacent to each other in a circumferential direction rotate around the central axis of the separator cutting drum 12 at a constant speed by means of the rotation of the separator cutting drum 12. Also, by the driving of the motor of each holding head, the relative speed of the two holding heads can be changed in a certain section on the circumference of the drum. The change in the relative speed of the first and second holding heads and the combination of the rotation of the separator cutting drum 12 and the driving of the motors provided in the holding heads are the same as those in the case of the first electrode cutting drum 2.

The separator cutting drum 12 adsorbs and holds the supplied continuous laminated body 26 and rotates to convey the continuous laminated body 26. At a cutting position 28 schematically illustrated in FIG. 1, the separator cutting drum 12 cuts the continuous laminated body 26 to produce the unit laminated bodies. The continuous laminated body 26 is cut by the cutting blade at a position between adjacent holding heads, so that multiple individual unit laminated bodies are obtained. At the time, in the continuous laminated body 26, the first separator continuous body S1 and the second separator continuous body S2 are cut at a position between electrode plates that are adjacent in the conveying direction of the continuous laminated body 26. Each unit laminated body thus obtained is conveyed while being adsorbed and held by each holding head. A holding head discharges, to the laminating drum 14 side, a unit laminated body that the holding head has adsorbed and held. The separator cutting drum 12 may include various cameras. Such cameras can monitor the positions of the multiple produced unit laminated bodies. As an example, the position of the continuous laminated body 26 before the cutting is monitored at a conveying roller located on the upstream side of the separator cutting drum 12. The separator cutting drum 12 may also include a sensor besides cameras to monitor the position of a holding head or the like.

The laminating drum 14 laminates multiple unit laminated bodies on a lamination stage 30 to form a laminated electrode assembly. The laminating drum 14 has a seventh radius and rotates at a seventh angular velocity around the central axis. The linear velocity of the laminating drum 14 is adjusted to be substantially identical with the linear velocity of the separator cutting drum 12. The laminating drum 14 includes multiple laminating heads arranged in a circumferential direction of the drum. Each laminating head includes a holding surface that adsorbs and holds a unit laminated body. The holding surface of each laminating head faces outward from the laminating drum 14.

Each of the multiple laminating heads rotates around the central axis of the laminating drum 14 and can also move in a circumferential direction of the drum independently of other laminating heads. Relative movement of each laminating head is achieved, for example, by a cam provided on the laminating drum 14. For example, a first laminating head and a second laminating head adjacent to each other in a circumferential direction rotate around the central axis of the laminating drum 14 at a constant speed by means of the rotation of the laminating drum 14. Also, the relative speed of those laminating heads can be changed in a certain section on the circumference of the drum.

For example, at one timing, both the first and second laminating heads rotate at a constant speed and have a relative speed of zero; at another timing, the first laminating head increases its speed in a direction away from the subsequent second laminating head, so that the laminating heads have a finite relative speed. With such independent driving of the laminating heads, while the rotation of the laminating drum 14 can be maintained at a constant angular velocity, each laminating head can be placed in a stop state at a laminating position facing the lamination stage 30. By placing a laminating head in the stop state at a position facing the lamination stage 30, the unit laminated body adsorbed and held by the laminating head can be discharged onto the lamination stage 30 with high positional accuracy.

The lamination stage 30 is disposed immediately beneath the laminating drum 14. On the lamination stage 30, the unit laminated bodies discharged from the laminating drum 14 are sequentially laminated. Thus, a laminated electrode assembly is formed. The lamination stage 30 can be driven in an X-axis direction and a Y-axis direction perpendicular to each other. Also, a tilt angle on an X-Y plane of the lamination stage 30 can be adjusted. This enables adjustment of the positions in the X-axis direction and the Y-axis direction and the tilt angle of a unit laminated body discharged from the laminating drum 14, with respect to a unit laminated body already laminated on the lamination stage 30. The lamination stage 30 includes clicks at the four corners, and the multiple unit laminated bodies laminated on the lamination stage 30 are pressed and fixed by the clicks. Also, the multiple unit laminated bodies thus laminated are pressurized and/or heated to be bonded to each other.

Figure 2:
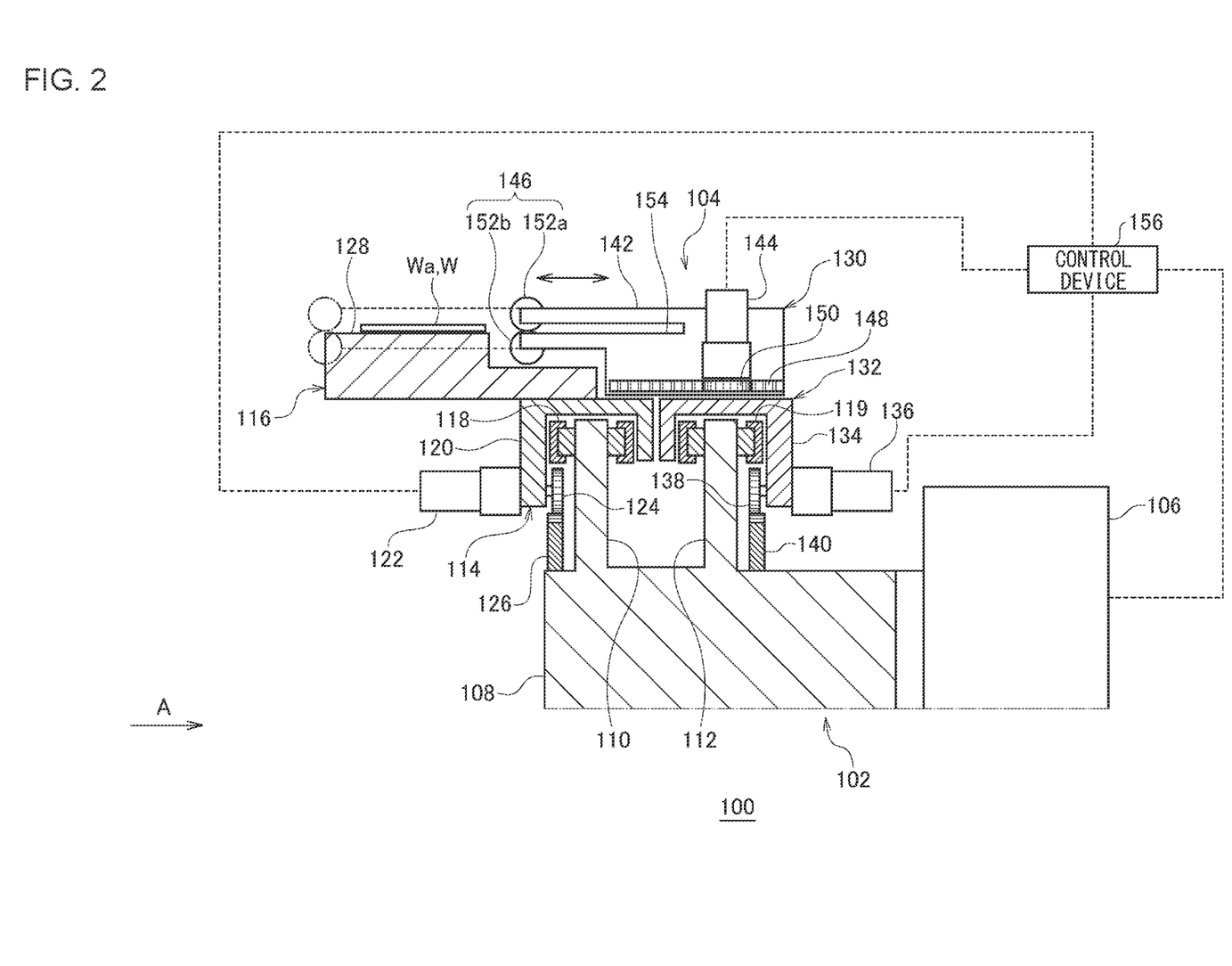
FIG. 2 is a sectional view that schematically illustrates part of a cutting device according to the embodiment.
Figure 3:
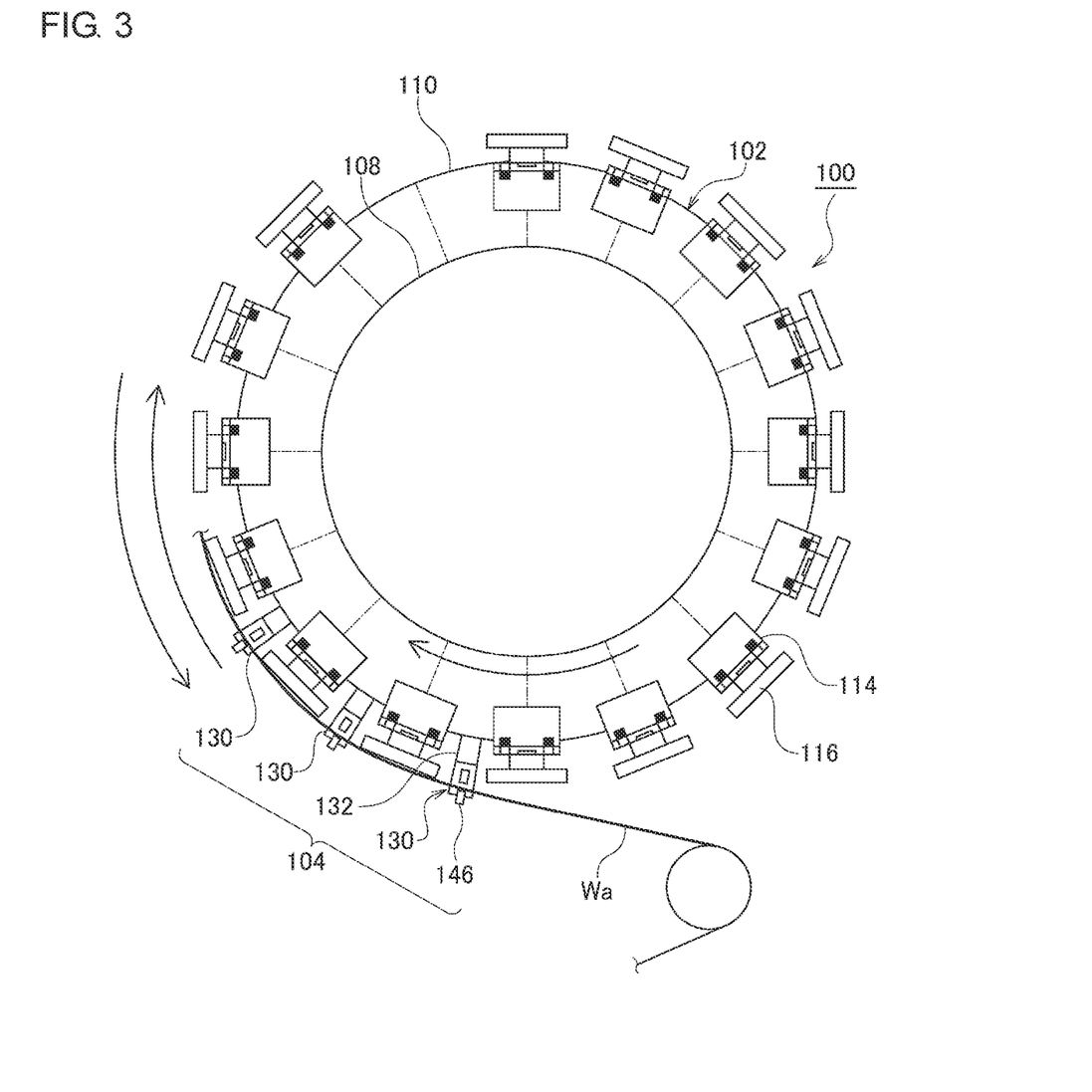
FIG. 3 is a front view that schematically illustrates the cutting device according to the embodiment.

At least one of the first electrode cutting drum 2, the second electrode cutting drum 6, or the separator cutting drum 12 is constituted by a cutting device 100 according to the present embodiment described below. In the following, citing the case where the first electrode cutting drum 2 is constituted by the cutting device 100 as an example, the structure of the cutting device 100 will be described. FIG. 2 is a sectional view that schematically illustrates part of the cutting device 100 according to the embodiment. FIG. 3 is a front view that schematically illustrates the cutting device 100 according to the embodiment. FIG. 2 illustrates half of a cross section of the cutting device 100. FIG. 3 illustrates the cutting device 100 observed from the direction of arrow A in FIG. 2. In FIG. 3, the illustration of each part is simplified or omitted as appropriate.

The cutting device 100 constituting the first electrode cutting drum 2 includes a drum section 102 and a cutting section 104. The drum section 102 includes a drum drive unit 106, a rotating shaft 108, a first disk unit 110, a second disk unit 112, multiple head drive units 114, and multiple holding heads 116. The drum drive unit 106 is constituted by a publicly-known motor or the like. The rotating shaft 108 has a cylindrical shape and is connected at one end to the drum drive unit 106. The rotating shaft 108 corresponds to the central axis of the first electrode cutting drum 2. The rotating shaft 108 rotates by means of the driving of the drum drive unit 106. The drum drive unit 106 rotates the rotating shaft 108 at the first angular velocity.

The first disk unit 110 and the second disk unit 112 are connected to the other end side of the rotating shaft 108 at the respective centers. The first disk unit 110 and the second disk unit 112 have the same shape and extend parallel with each other. The first disk unit 110 is disposed farther from the drum drive unit 106 than the second disk unit 112. The first disk unit 110 and the second disk unit 112 protrude from an outer circumferential surface of the rotating shaft 108 and extend perpendicularly to an axial direction of the rotating shaft 108. On a circumferential edge part of the first disk unit 110, an arc guide 118 is provided. Also, on a circumferential edge part of the second disk unit 112, an arc guide 119 is provided. The arc guide 118 and the arc guide 119 extend parallel with each other.

The multiple head drive units 114 are arranged in a circumferential direction of the first disk unit 110. Each head drive unit 114 includes a bracket 120, a motor 122, and a small gear 124. The bracket 120 has a substantial U-shape in cross section, and the both sides of the substantial U-shape sandwich an edge of the first disk unit 110 via the arc guide 118. The motor 122 is supported by the bracket 120. For the motor 122, a publicly-known motor may be used. The small gear 124 is connected to the rotating shaft of the motor 122 and rotates by means of the driving of the motor 122. The small gear 124 meshes with a large gear 126 fixed to the first disk unit 110 side. The large gear 126 of the present embodiment is fixed to an outer circumferential surface of the rotating shaft 108. The large gear 126 is provided over the entire circumference of the rotating shaft 108. When the motor 122 is driven, the drive torque is transmitted to the large gear 126 that meshes with the small gear 124. This allows each head drive unit 114 to move independently on the circumference of the first disk unit 110 along the arc guide 118.

The multiple holding heads 116 are supported respectively by the head drive units 114. Accordingly, the multiple holding heads 116 are arranged in a circumferential direction of the first disk unit 110. Each holding head 116 rotates around the rotating shaft 108 by means of the rotation of the first disk unit 110 and, besides the move by means of the rotation of the first disk unit 110, each holding head 116 can also move by means of a head drive unit 114.

Each holding head 116 includes a holding surface 128 that faces the protruding direction of the first disk unit 110, i.e., faces outward from the circumference of the drum section 102. The holding surface 128 is positioned at a distance of the first radius from the center of the rotating shaft 108. On the holding surface 128, an adsorption hole (not illustrated) is provided to adsorb and hold a continuous body Wa of works W, and a work W obtained individually by dividing the continuous body Wa. Since air is sucked through the adsorption hole, the continuous body Wa or a work W is adsorbed and held by the suction force. The work W may be an electrode plate, a separator, or a unit laminated body, for example. In the case of the first electrode cutting drum 2, the continuous body Wa is the first electrode continuous body N, and the works W are the first electrode plates. The continuous body Wa is conveyed by the rotation of the first disk unit 110 while being adsorbed and held by the holding surfaces 128 of the multiple holding heads 116.

The cutting section 104 cuts the continuous body Wa into multiple individual works W. The cutting section 104 includes a cutter unit 130 and a cutter drive unit 132. The cutter unit 130 moves together with the multiple holding heads 116 by means of the rotation of the drum section 102 to cut the continuous body Wa. The cutter drive unit 132 moves the cutter unit 130 independently of the multiple holding heads 116. The cutting section 104 includes the cutter unit 130 that is smaller in number than the holding heads 116. As an example, the cutting device 100 of the present embodiment includes three cutter units 130, with respect to 15 holding heads 116. The interval between adjacent cutter units 130 is determined so that one holding head 116 or one work W can be accommodated therebetween.

The cutter drive unit 132 is provided in each cutter unit 130. The cutter drive units 132 are arranged in a circumferential direction of the second disk unit 112. Each cutter drive unit 132 includes a bracket 134, a motor 136, and a small gear 138. The bracket 134 has a substantial U-shape in cross section, and the both sides of the substantial U-shape sandwich an edge of the second disk unit 112 via the arc guide 119. The motor 136 is supported by the bracket 134. For the motor 136, a publicly-known motor may be used. The small gear 138 is connected to the rotating shaft of the motor 136 and rotates by means of the driving of the motor 136. The small gear 138 meshes with a large gear 140 fixed to the second disk unit 112 side. The large gear 140 of the present embodiment is fixed to an outer circumferential surface of the rotating shaft 108. The large gear 140 is provided at least within a range from a cutting start position T1 to a receding end position T3, which will be described later. When the motor 136 is driven, the drive torque is transmitted to the large gear 140 that meshes with the small gear 138. This allows each cutter drive unit 132 to move independently on the circumference of the second disk unit 112 along the arc guide 119.

The cutter units 130 are supported respectively by the cutter drive units 132. Accordingly, the cutter units 130 are arranged in a circumferential direction of the second disk unit 112. Each cutter unit 130 rotates around the rotating shaft 108 by means of the rotation of the second disk unit 112 and, besides the move by means of the rotation of the second disk unit 112, each cutter unit 130 can also move by means of a cutter drive unit 132.

Each cutter unit 130 includes a holder 142, a motor 144, and a cutting blade 146. The holder 142 is supported by the corresponding bracket 134. The holder 142 can slide in a direction substantially perpendicular to the extending direction of the continuous body Wa, i.e., a direction substantially perpendicular to a circumferential direction of the drum section 102. The holder 142 extends in a direction along which the first disk unit 110 and the second disk unit 112 are arranged and supports the cutting blade 146 at an end on the first disk unit 110 side. Also, in an area of the holder 142 opposite to the end that supports the cutting blade 146, a rack rail 148 is provided. The rack rail 148 extends in a direction along which the first disk unit 110 and the second disk unit 112 are arranged.

The motor 144 is supported by the corresponding bracket 134. For the motor 144, a publicly-known motor may be used. To the rotating shaft of the motor 144, a pinion 150 is connected. The pinion 150 is meshed with the rack rail 148 in the holder 142. The rack rail 148 and the pinion 150 constitute a rack and pinion mechanism; when the motor 144 is driven to rotate the pinion 150, the drive torque is transmitted to the rack rail 148, so that the holder 142 slides. Such sliding of the holder 142 can allow the cutting blade 146 supported by the holder 142 to advance toward and recede from the continuous body Wa. In FIG. 2, the cutting blade 146 positioned after receding from the continuous body Wa is illustrated with solid lines, and the cutting blade 146 positioned after advancing toward the continuous body Wa is illustrated with dotted lines.

The cutting blade 146 cuts the continuous body Wa into multiple individual works W. The cutting blade 146 of the present embodiment is constituted by a pair of circular blades 152a and 152b. The circular blades 152a and 152b are arranged in a thickness direction of the continuous body Wa, and the positions of the circular blades 152a and 152b with respect to a holding surface 128 are determined such that, when the circular blades 152a and 152b advance toward or recede from the continuous body Wa, the continuous body Wa can pass between the two blades. When the holder 142 slides and the cutting blade 146 advances toward the continuous body Wa, the circular blades 152a and 152b rotate to cut the continuous body Wa. The cutting blade 146 passes between two adjacent holding heads 116 to advance toward or recede from the continuous body Wa.

The holder 142 includes a slit 154, extending in a sliding direction of the holder 142, between the circular blades 152a and 152b. When the cutting blade 146 moves to the advance position, an end of the cut work W enters the slit 154. This avoids interference between the holder 142 and the work W.

The operation of the drum drive unit 106, the head drive units 114, the cutter drive units 132, and the cutter units 130 is controlled by a control device 156. The control device 156 may be implemented by an element such as a CPU or memory of a computer or by a circuit as a hardware configuration, and by a computer program or the like as a software configuration. FIG. 2 illustrates a functional block implemented by cooperation of such components. It will be naturally understood by those skilled in the art that the functional block may be implemented in a variety of forms by combinations of hardware and software.

The control device 156 receives image data from a camera that images the first electrode cutting drum 2 and, based on the positions of each holding head 116 and each cutter unit 130 and the like derived from the image data, the control device 156 can control the operation of each part. The control device 156 may also acquire information from a sensor other than the camera to control the operation of each part. The control device 156 can also control the operation of each part based on a preset operation program.

Figure 4:
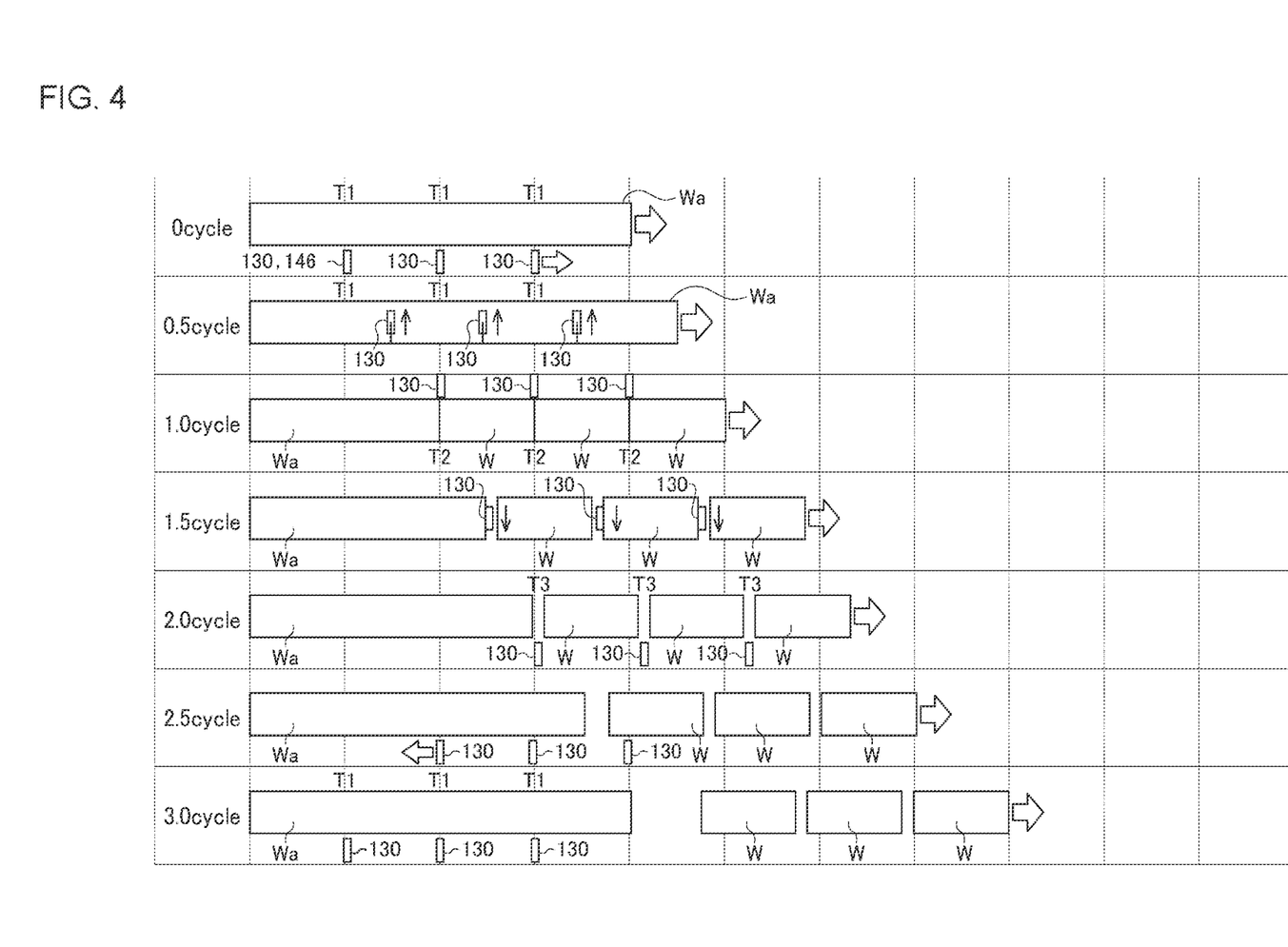
FIG. 4 shows timing charts of a process of cutting a continuous body.

In the process of cutting the continuous body Wa, the operation of each part is controlled as follows. FIG. 4 shows timing charts of the process of cutting the continuous body Wa. The drum drive unit 106 is controlled to rotate constantly. Accordingly, by the movement of each holding head 116 caused by the rotation of the drum section 102, the continuous body Wa is continuously conveyed.

A cutter unit 130 is placed at a predetermined cutting start position T1 (0cycle) and moves alongside of the continuous body Wa from the cutting start position T1 to cut the continuous body Wa (0.5cycle-1.0cycle). More specifically, while moving alongside of the conveyed continuous body Wa, the cutter unit 130 advances the cutting blade 146 toward the continuous body Wa. Accordingly, the continuous body Wa is cut. At the time when the cutting of the continuous body Wa is completed, the cutter unit 130 reaches a cutting end position T2.

Each cutter unit 130 can move alongside of the continuous body Wa by means of the rotation of the drum section 102. In addition to the conveyance of the continuous body Wa by means of the rotation of the drum section 102, the continuous body Wa may also be conveyed by means of the driving of each head drive unit 114. In this case, the movement of each cutter unit 130 corresponding to the conveyance by means of the driving of each head drive unit 114 is supplemented by the driving of each cutter drive unit 132.

After cutting the continuous body Wa, while moving alongside of the conveyed continuous body Wa, the cutter unit 130 makes the cutting blade 146 recede from the continuous body Wa (1.5cycle-2.0cycle). At the time when the receding of the cutting blade 146 is completed, the cutter unit 130 reaches the receding end position T3. Subsequently, the cutter drive unit 132 returns, to the cutting start position T1, the cutter unit 130 after the cutting of the continuous body Wa (2.5cycle-3.0cycle). More specifically, the cutter drive unit 132 moves the cutter unit 130, of which the cutting blade 146 has receded, in a direction opposite to the rotation direction of the drum section 102 to return the cutter unit 130 to the cutting start position T1. Thereafter, the operations of 0cycle to 3.0cycle set forth above will be repeated. Therefore, each cutter unit 130 moves back and forth in the range from the cutting start position T1 to the receding end position T3 in the entire circumference of the drum section 102.

Although the above description describes a case in which the first electrode cutting drum 2 is constituted by the cutting device 100, the second electrode cutting drum 6 or the separator cutting drum 12 may be constituted by the cutting device 100. When the second electrode cutting drum 6 is constituted by the cutting device 100, the continuous body Wa is the second electrode continuous body P, and the works W are the second electrode plates. Also, when the separator cutting drum 12 is constituted by the cutting device 100, the continuous body Wa is the continuous laminated body 26, and the works W are the unit laminated bodies.

As described above, the cutting device 100 according to the present embodiment includes the drum section 102 that rotates to convey a continuous body Wa of works W, and the cutting section 104 that cuts the continuous body Wa into multiple individual works W. The drum section 102 includes multiple holding heads 116 that are arranged in its circumferential direction and move while holding the respective works W. The cutting section 104 includes the cutter unit 130 that moves together with the multiple holding heads 116 by means of the rotation of the drum section 102 and that is smaller in number than the holding heads 116, and the cutter drive unit 132 that moves the cutter unit 130 independently of the multiple holding heads 116. The cutter unit 130 moves alongside of the continuous body Wa from a certain cutting start position T1 to cut the continuous body Wa. The cutter drive unit 132 returns the cutter unit 130 that has cut the continuous body Wa, to the cutting start position T1.

In the cutting device 100 according to the present embodiment, the cutter unit 130 moving alongside of the continuous body Wa cuts the continuous body Wa. Accordingly, the continuous body Wa can be cut when the relative speed of the cutter unit 130 and the continuous body Wa is substantially zero. Therefore, the continuous body Wa can be cut with high positional accuracy. Also, compared to the case of obtaining individual works W by breaking the continuous body Wa along the break lines, occurrence of burrs at the cut section of each electrode plate in an individually divided work W can be avoided. This can improve the quality of laminated electrode assemblies. Also, since the continuous body Wa can be cut without stopping the conveyance of the continuous body Wa, throughput reduction can also be restrained.

In the case where each cutter unit 130 cuts the continuous body Wa while moving alongside of the continuous body Wa, a structure in which a cutter unit 130 is provided for each holding head 116 is also conceivable. However, in this case, since the number of cutter units 130 is increased, the man-hours for setting and maintenance, such as positioning and condition management of the cutting blades 146, required to eliminate quality differences in the works W are also increased, so that the manufacturing cost and the management cost of the cutting device are also increased. In contrast, since the number of cutter units 130 with respect to the number of holding heads 116 is reduced in the cutting device 100 according to the present embodiment, such increase of the costs can be restrained. Therefore, the cutting device 100 of the present embodiment can improve the quality of laminated electrode assemblies more easily.

Each cutter unit 130 includes the cutting blade 146 capable of advancing toward and receding from the continuous body Wa. While moving alongside of the continuous body Wa being conveyed, the cutting blade 146 advances toward the continuous body Wa to cut the continuous body Wa, and, after cutting the continuous body Wa, the cutting blade 146 recedes from the continuous body Wa while moving alongside of the continuous body Wa. A corresponding cutter drive unit 132 returns the cutter unit 130 of which the cutting blade 146 has receded, to the cutting start position T1. Accordingly, the cutting blade 146 can be made to recede without stopping the conveyance of the continuous body Wa and the works W, while avoiding interference between the cutting blade 146 and the continuous body Wa or a work W. This can improve the quality of the works W and also restrain the throughput reduction.

Also, the manufacturing device 1 for a laminated electrode assembly according to the present embodiment includes: the first electrode cutting drum 2 that cuts a continuous body of multiple first electrode plates into multiple first electrode plates and conveys the first electrode plates; the second electrode cutting drum 6 that cuts a continuous body of multiple second electrode plates into multiple second electrode plates and conveys the second electrode plates; the bonding drum 10 that laminates and bonds the first separator continuous body S1 in which multiple first separators are continuously arranged, multiple first electrode plates supplied from the first electrode cutting drum 2, the second separator continuous body S2 in which multiple second separators are continuously arranged, and multiple second electrode plates supplied from the second electrode cutting drum 6 in this order, so as to form a continuous laminated body 26 in which unit laminated bodies, which each are constituted by a first separator, a first electrode plate, a second separator, and a second electrode plate, are continuously arranged; the separator cutting drum 12 that cuts the first separator continuous body S1 and the second separator continuous body S2 in the continuous laminated body 26 to obtain multiple unit laminated bodies; and the laminating drum 14 that laminates multiple unit laminated bodies on the lamination stage 30 to form a laminated electrode assembly. Also, at least one of the first electrode cutting drum 2, the second electrode cutting drum 6, or the separator cutting drum 12 is constituted by the cutting device 100 according to the present embodiment. This enables both the quality improvement and the throughput improvement of the laminated electrode assemblies and thus the batteries.

An embodiment of the present disclosure has been described in detail. The abovementioned embodiment merely describes a specific example for carrying out the present disclosure. The embodiment is not intended to limit the technical scope of the present disclosure, and various design modifications, including changes, addition, and deletion of constituting elements, may be made to the embodiment without departing from the scope of ideas of the present disclosure defined in the claims. Such an additional embodiment with a design modification added has the effect of each of the combined embodiments and modifications. In the aforementioned embodiment, matters to which design modifications may be made are emphasized with the expression of "of the present embodiment", "in the present embodiment", or the like. However, design modifications may also be made to matters without such expression. Optional combinations of the abovementioned constituting elements may also be employed as additional modes of the present disclosure. Also, the hatching provided on the cross sections in the drawings does not limit the materials of the objects with the hatching.

The invention claimed is:

1. A cutting device, comprising:
   a drum section that rotates to convey a continuous body of works; and
   a cutting section that cuts the continuous body into a plurality of individual works,
   wherein the drum section comprises a drum drive unit, a rotating shaft, a first disk unit, a second disk unit, a plurality of holding heads, and head drive units,
   wherein the head drive units respectively hold and move the plurality of holding heads so that the plurality of holding heads i) hold the continuous body prior to being cut into the plurality of individual works by the cutting section and ii) respectively hold the plurality of individual works obtained by the cutting section cutting the continuous body into the plurality of individual works,
   wherein the plurality of holding heads are arranged in a circumferential direction of the first disk unit of the drum section so that the plurality of holding heads rotates about the rotating shaft in accordance with rotation of the first disk unit,
   wherein each of the plurality of holding heads comprises a holding surface that is positioned at a distance of a first radius from a center of the rotating shaft to face a protruding direction of the first disk unit,
   wherein the holding surface includes an adsorption hole so that the plurality of holding heads, using the adsorption hole, adsorb and hold i) the continuous body prior to being cut into the plurality of individual works by the cutting section and ii) the plurality of individual works obtained by the cutting section cutting the continuous body into the plurality of individual works,
   wherein the cutting section comprises a cutter drive unit and a cutter unit,
   wherein the cutter unit is arranged in a circumferential direction of the second disk unit of the drum section,
   wherein the cutter unit includes a holder, a motor, and a cutting blade,
   wherein the holder of the cutter unit is supported by a corresponding bracket and is arranged to slide in a direction perpendicular to a circumferential direction of the drum section,
   wherein the cutter unit moves together with the plurality of the holding heads by means of the rotation of the drum section and that is smaller in number than the holding heads, and a cutter drive unit that moves the cutter unit independently of the plurality of the holding heads,
   wherein the cutter unit moves alongside of the continuous body from a predetermined cutting start position to cut the continuous body,
   wherein the cutter drive unit returns the cutter unit that has cut the continuous body, to the predetermined cutting start position, and
   wherein the cutting device comprises a control device arranged to control the drum drive unit, the head drive units, the cutter drive unit and the cutter unit.

2. The cutting device according to claim 1, wherein
while the cutter unit moves alongside of the continuous body being conveyed by the drum section, the cutting blade of the cutter unit advances toward the continuous body to cut the continuous body into the plurality of individual works, and, after the cutting blade cuts the continuous body into the plurality of individual works, the cutting blade recedes from the continuous body while moving alongside of the continuous body, and the cutter drive unit returns the cutter unit of which the cutting blade has receded, to the predetermined cutting start position.

3. A manufacturing device for a laminated electrode assembly, the manufacturing device comprising:
- a first electrode cutting drum that cuts a continuous body of a plurality of first electrode plates into a plurality of the first electrode plates and conveys the plurality of first electrode plates;
- a second electrode cutting drum that cuts a continuous body of a plurality of second electrode plates into a plurality of the second electrode plates and conveys the plurality of second electrode plates;
- a bonding drum that laminates and bonds a first separator continuous body in which a plurality of first separators are continuously arranged, the plurality of the first electrode plates supplied from the first electrode cutting drum, a second separator continuous body in which a plurality of second separators are continuously arranged, and the plurality of the second electrode plates supplied from the second electrode cutting drum in this order, so as to form a continuous laminated body in which unit laminated bodies, which each are constituted by one first separator of the plurality of first separators, one first electrode plate of the plurality of first electrode plates, one second separator of the plurality of the second separators, and one second electrode plate of the plurality of the second electrode plates, are continuously arranged;
- a separator cutting drum that cuts the first separator continuous body and the second separator continuous body in the continuous laminated body to obtain a plurality of the unit laminated bodies; and
- a laminating drum that laminates the plurality of the unit laminated bodies on a lamination stage to form a laminated electrode assembly, wherein
at least one of the first electrode cutting drum, the second electrode cutting drum, or the separator cutting drum is constituted by the cutting device according to claim 1.

* * * * *